US007763350B2

(12) United States Patent
Desai et al.

(10) Patent No.: US 7,763,350 B2
(45) **Date of Patent: *Jul. 27, 2010**

(54) COATED ARTICLES DEMONSTRATING HEAT REDUCTION AND NOISE REDUCTION PROPERTIES

(75) Inventors: Umesh C. Desai, Wexford, PA (US); Ion Pelinescu, Wexford, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 12/165,869

(22) Filed: Jul. 1, 2008

(65) Prior Publication Data

US 2010/0003506 A1 Jan. 7, 2010

(51) Int. Cl.
*B32B 17/10* (2006.01)
*C09J 7/02* (2006.01)
*C09B 67/00* (2006.01)

(52) U.S. Cl. ....................... 428/339; 428/325; 428/336; 428/337; 428/418; 428/458; 524/441; 524/502; 525/438

(58) Field of Classification Search ................. 524/377, 524/441, 502; 523/455; 525/438, 533; 526/251, 526/296, 310, 320; 428/143, 148, 336, 413, 428/418, 335, 522, 325, 339, 337
See application file for complete search history.

(56) References Cited

U.S. PATENT DOCUMENTS

| | | | | |
|---|---|---|---|---|
| 4,739,019 | A | 4/1988 | Schappert et al. | |
| 6,376,608 | B1 * | 4/2002 | Barkac et al. | 525/124 |
| 6,749,939 | B2 * | 6/2004 | Desai et al. | 428/413 |
| 6,872,761 | B2 * | 3/2005 | LeStarge | 523/218 |
| 2003/0187145 | A1 | 10/2003 | Martin et al. | |
| 2006/0003104 | A1 * | 1/2006 | Chao et al. | 427/372.2 |
| 2010/0004369 | A1 * | 1/2010 | Desai et al. | 524/405 |

OTHER PUBLICATIONS

"Colour metallics in powder coatings." Technical: Focus on Powder Coatings. Nov. 2003, p. 2.*

* cited by examiner

*Primary Examiner*—Vasu Jagannathan
*Assistant Examiner*—Hannah Pak
(74) *Attorney, Agent, or Firm*—Robert A. Diaz

(57) ABSTRACT

A coated article comprising (a) a substrate having two opposing surfaces; (b) a first curable film-forming composition applied to one surface of the substrate; and (c) a second curable film-forming composition applied to the opposing surface of the substrate, wherein the opposing surface is not coated with the first curable film-forming composition. Component (b) comprises a resinous binder; optionally, a curing agent and a metallic reflective pigment while component (c) comprises a polyepoxide; a thermoplastic polyester polymer; a curing agent a mineral filler; and microspheres.

22 Claims, 4 Drawing Sheets

Material Loss Factor - Example B

Material Loss Modulus - Example B

Absorption Coefficient
Example C

COATED ARTICLES DEMONSTRATING HEAT REDUCTION AND NOISE REDUCTION PROPERTIES

FIELD OF THE INVENTION

The present invention relates to coated articles demonstrating heat reflection, insulation, and noise reduction by reducing vibration damping and having sound absorption.

BACKGROUND OF THE INVENTION

Metal substrates used in industrial applications and as parts in vehicular or other engine and exhaust systems are routinely subjected to extreme high temperatures, which over time may lead to fatigue, cracking, distortion, and other failures of the substrate. For example, components near an automotive exhaust system can be exposed to temperatures in excess of 400° C. In such a situation, it is readily apparent that fatiguing or cracking can lead to catastrophic failure. Insulating an automotive floor pan is especially challenging when the distance between the exhaust system and the floor is reduced, as in more compact cars. Conventionally, the automotive industry inserts aluminum sheet between the exhaust system and the floor-pan to deflect and insulate, with air gap or insulation pads between the aluminum sheet and floor-pan. This method has high manual labor costs and requires extra spacing between the exhaust system and the floor-pan.

In addition to heat reflection sheets, barrier, sealants and sound dampeners typically are applied to a variety of areas in automobile bodies such as interior floor pans, firewalls, decklids, and between the inner and outer panels of doors. Conventionally, sealants have comprised plastisols that can be applied between and upon metal seams, welds and within hollow cavities of auto bodies. Generally, sealants are used to impart structural integrity and to create a barrier against dirt, moisture, and exhaust gases. Sound dampeners typically are pre-cut pieces of fibrous asphaltic material, Liquid Applied Sound Damper (LASD) or aluminum constrained butylene rubber used to dampen road and engine noise that can be transmitted through the auto body substrates.

Conventionally, sealants and sound dampeners are applied to some automotive parts in the paint shop area of an automobile assembly plant which is typically located downstream from the electrocoat tank in the automotive coating process. The manual application of sealants and sound dampeners in the paint shop area can result in fingerprints, dirt and/or overspray on the automotive part which must be removed prior to subsequent application of primer and/or top coatings. Robotically applied LASD eliminates these defects and need for cleaning stage. It would be advantageous if robotically applied LASD has multifunctional properties, such as heat insulation properties, and sound absorption properties in addition to the vibration damping, especially on the floor pan above the exhaust system and the firewall area.

It would further be desirable to provide heat reflective, curable film-forming compositions applied to the opposite side of the substrate facing exhaust system or the engine compartment that can minimize the heat passing through the substrate, eliminating the need for manually inserted sheets and pads and thereby saving space between the exhaust system and the floor-pan.

SUMMARY OF THE INVENTION

The present invention is directed to coated articles comprising:

(a) a substrate having two opposing surfaces;

(b) a first curable film-forming composition applied to one surface of the substrate, the first curable film-forming composition comprising:

- (i) a resinous binder comprising a polyepoxide, a polyamideimide, a polyimide, and/or a polysiloxane;
- (ii) optionally, a curing agent having functional groups reactive with functional groups on the resinous binder in (a); and
- (iii) a metallic reflective pigment; and (c) a second curable film-forming composition applied to the opposing surface of the substrate, the second curable film-forming composition comprising:

- (i) a polyepoxide containing at least two epoxide groups per molecule;
- (ii) a thermoplastic polyester polymer;
- (iii) a curing agent having functional groups reactive with the epoxide groups in (c)(i);
- (iv) a mineral filler; and
- (v) microspheres comprising expandable microspheres which expand during curing of the composition and/or hollow microspheres.

DETAILED DESCRIPTION OF THE INVENTION

Figure 1:
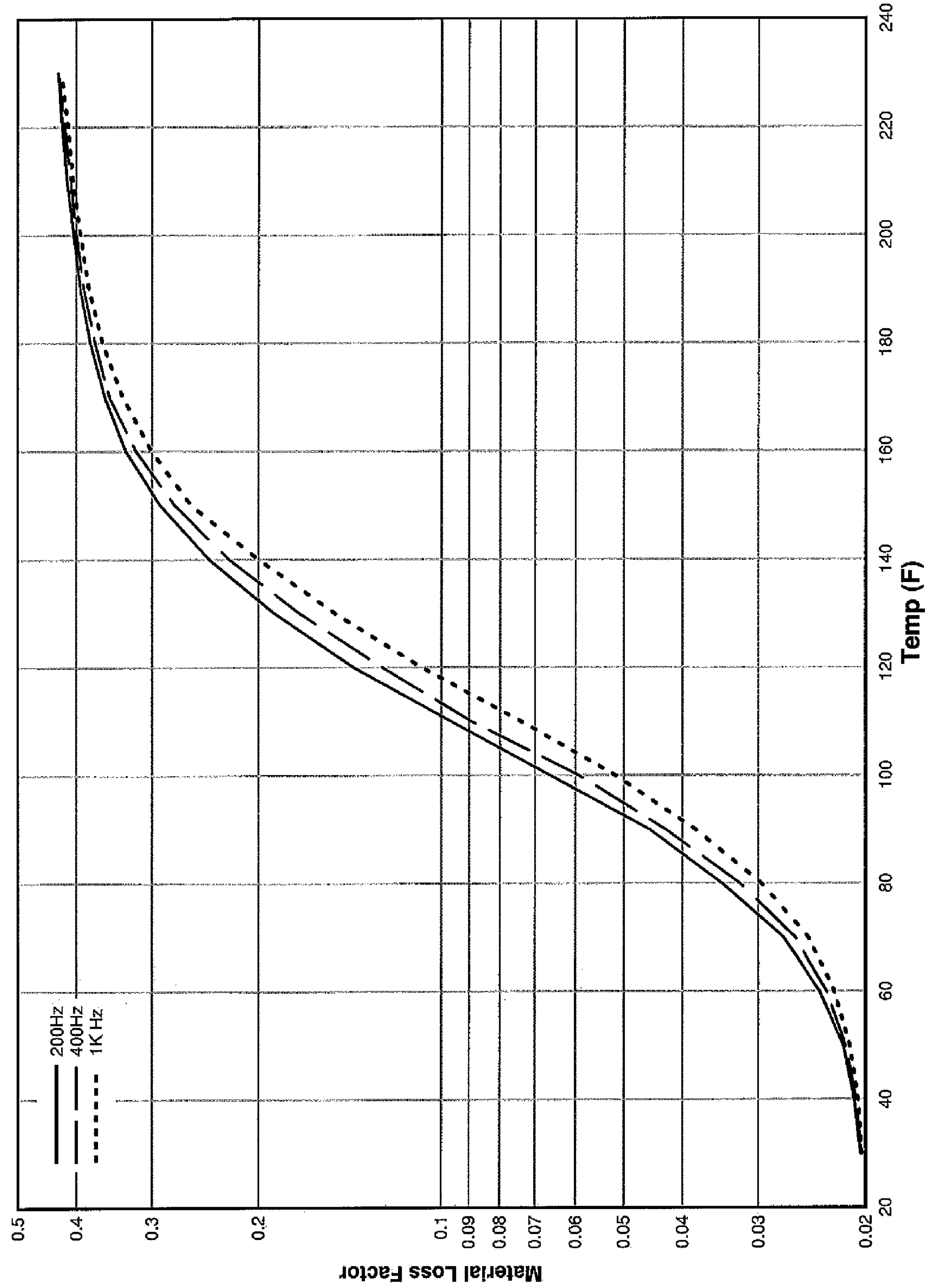
FIG. 1 illustrates a graph of Material Loss Factor at a frequency of 200 Hz, 400 Hz, and 1 KHz for the composition of Example B.

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a," "an," and "the" include plural referents unless expressly and unequivocally limited to one referent.

The various embodiments and examples of the present invention as presented herein are each understood to be non-limiting with respect to the scope of the invention.

As used in the following description and claims, the following terms have the meanings indicated below:

By "polymer" is meant a polymer including homopolymers and copolymers, and oligomers. By "composite material" is meant a combination of two or more differing materials.

The term "curable", as used for example in connection with a curable composition, means that the indicated composition is polymerizable or cross linkable through functional groups, e.g., by means that include, but are not limited to, thermal (including ambient cure) and/or catalytic exposure.

The term "cure", "cured" or similar terms, as used in connection with a cured or curable composition, e.g., a "cured composition" of some specific description, means that at least a portion of the polymerizable and/or crosslinkable components that form the curable composition is polymerized and/or crosslinked. Additionally, curing of a polymerizable composition refers to subjecting said composition to curing conditions such as but not limited to thermal curing, leading to the reaction of the reactive functional groups of the composition, and resulting in polymerization and formation of a polymerizate. When a polymerizable composition is subjected to curing conditions, following polymerization and after reaction of most of the reactive end groups occurs, the rate of reaction of the remaining unreacted reactive end groups becomes progressively slower. The polymerizable composition can be subjected to curing conditions until it is at least partially cured. The term "at least partially cured" means subjecting the polymerizable composition to curing conditions, wherein reaction of at least a portion of the reactive groups of the composition occurs, to form a polymerizate. The polymerizable composition can also be subjected to curing conditions such that a substantially complete cure is attained and wherein further curing results in no significant further improvement in polymer properties, such as hardness.

The term "reactive" refers to a functional group capable of undergoing a chemical reaction with itself and/or other functional groups spontaneously or upon the application of heat or in the presence of a catalyst or by any other means known to those skilled in the art.

Substrates suitable for use in the coated articles of the present invention include rigid metal substrates such as titanium, ferrous metals, aluminum, aluminum alloys, copper, and other metal and alloy substrates. Non-limiting examples of useful steel materials include cold rolled steel, galvanized (zinc coated) steel, electrogalvanized steel, stainless steel, pickled steel, zinc-iron alloy such as GALVANNEAL, and combinations thereof. Combinations or composites of ferrous and non-ferrous metals can also be used. The substrate has two opposing surfaces and is typically provided in the form of a sheet. It may be formed into the desired end shape prior to application of the coating compositions.

When the article is used in automotive applications, the thickness of the automotive substrate typically ranges from 0.254 to 3.18 millimeters (mm) (10 to 125 mils), typically 0.6 to 1.2 mm (23.6 to 47.2 mils) although the thickness can be greater or less, as desired. The width of a coil strip generally ranges from 30.5 to 183 centimeters (12 to 72 inches), although the width of the substrate can vary depending upon its shape and intended use.

Before depositing any treatment or coating compositions upon the surface of the substrate, it is common practice, though not necessary, to remove foreign matter from the surface by thoroughly cleaning and degreasing the surface. Such cleaning typically takes place after forming the substrate (stamping, welding, etc.) into an end-use shape. The surface of the substrate can be cleaned by physical or chemical means, such as mechanically abrading the surface or cleaning/degreasing with commercially available alkaline or acidic cleaning agents which are well known to those skilled in the art, such as sodium metasilicate and sodium hydroxide. A non-limiting example of a cleaning agent is CHEMKLEEN 163, an alkaline-based cleaner commercially available from PPG Industries, Inc.

Following the cleaning step, the substrate may be rinsed with deionized water or an aqueous solution of rinsing agents in order to remove any residue. The substrate can be air dried, for example, by using an air knife, by flashing off the water by brief exposure of the substrate to a high temperature or by passing the substrate between squeegee rolls.

The substrate to which the compositions are applied may be a bare, cleaned surface; it may be oily, pretreated with one or more pretreatment compositions, and/or prepainted with one or more coating compositions, primers, etc., applied by any method including, but not limited to, electrodeposition, spraying, dip coating, roll coating, curtain coating, and the like.

Note that the first and second curable film-forming compositions may be applied to the surfaces of the substrate in any order. The terms "first" and "second" serve only to distinguish the separate compositions from each other, and do not necessarily refer to the order in which they are applied to the substrate. Moreover, the compositions may be applied simultaneously, or after application of one of the compositions, the coated substrate may be transferred to a separate manufacturing facility for subsequent application of the other composition.

A first curable film-forming composition is applied to one surface of the substrate. The first curable film-forming composition comprises a resinous binder (a) which may be a polyepoxide, a polyamideimide, a polyimide, and/or a polysiloxane. Mixtures of resinous binders, such as a combination of polysiloxane and polyepoxide, may be used.

Epoxy-functional polymers each typically have at least two epoxide or oxirane groups per molecule. As used herein, "epoxy-functional polymers" means epoxy-functional oligomers, polymers and/or copolymers. These materials often are referred to as di- or polyepoxides. Generally, the epoxide equivalent weight of the epoxy-functional polymer can range from about 70 to about 4,000, and usually about 140 to about 600, as measured by titration with perchloric acid and quaternary ammonium bromide using methyl violet as an indicator.

Suitable epoxy-functional polymers can be saturated or unsaturated, cyclic or acyclic, aliphatic, alicyclic, aromatic or heterocyclic. The epoxy-functional polymers can have pendant or terminal hydroxyl groups, if desired. They can contain substituents such as halogen, hydroxyl, and ether groups. A useful class of these materials includes polyepoxides comprising epoxy polyethers obtained by reacting an epihalohydrin (such as epichlorohydrin or epibromohydrin) with a di- or polyhydric alcohol in the presence of an alkali. Suitable polyhydric alcohols include polyphenols such as resorcinol; catechol; hydroquinone; bis(4-hydroxyphenyl)-2,2-propane, i.e., bisphenol A; bis(4-hydroxyphenyl)-1,1-isobutane; 4,4-dihydroxybenzophenone; bis(4-hydroxyphenol)-1,1-ethane; bis(2-hydroxyphenyl)-methane and 1,5-hydroxynaphthalene.

Frequently used polyepoxides include polyglycidyl ethers of Bisphenol A, such as EPON® 828 and 1001 epoxy resins, which are commercially available from Hexion Specialty Chemicals, Inc. EPON® 828 epoxy resin has a number average molecular weight of about 400 and an epoxy equivalent weight of about 185-192. Other useful polyepoxides include polyglycidyl ethers of polyhydric alcohols, polyglycidyl esters of polycarboxylic acids, polyepoxides that are derived from the epoxidation of an olefinically unsaturated alicyclic compound, polyepoxides containing oxyalkylene groups in the epoxy molecule, epoxy novolac resins, and polyepoxides that are partially defunctionalized by carboxylic acids, alcohol, water, phenols, mercaptans or other active hydrogen-containing compounds to give hydroxyl-containing polymers. These polyepoxides are well known to those skilled in the art and are described in U.S. Pat. No. 4,739,019 at column 2, line 6 through column 3, line 12. In particular embodiments, waterborne polyepoxides such as EPI-REZ 6520, a dispersion of Epon 1001, also available from Hexion Specialty Chemicals, is especially suitable.

Suitable polyamideimides include Vylomax HR-11NN available from TOYOBO COMPANY.

Suitable polyimides include U-Varnish available from UBE Industries, Ltd. Film formation is accomplished by condensation reaction during heat curing.

Suitable polysiloxanes include any of those known for use in coating compositions. For example, the polysiloxane may comprise at least one of the following structural units (I):

$$R^1_nR^2_mSiO_{(4-n-m)/2} \quad (I)$$

wherein each $R^1$, which may be identical or different, represents H, OH, a monovalent hydrocarbon group, and a monovalent siloxane group; each $R^2$, which may be identical or different, represents a group comprising at least one reactive functional group. Each of m and n depicted in the structural unit (I) above fulfills the requirements of $0<n<4$, $0<m<4$ and $2\leqq(m+n)<4$. When (m+n) is 3, the value represented by n can be 2 and the value represented by m is 1. Likewise, when (m+n) is 2, the value represented by each of n and m is 1.

The polysiloxane may alternatively have the following structure (II) or (III):

(II)

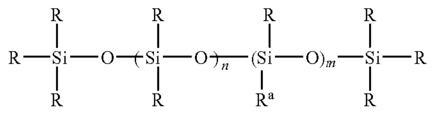

or (III)

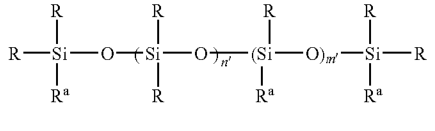

wherein m has a value of at least 1; m' ranges from 0 to 75; n ranges from 0 to 75; n' ranges from 0 to 75; each R, which may be identical or different, is selected from H, OH, a monovalent hydrocarbon group, a monovalent siloxane group, and mixtures of any of the foregoing; and $-R^a$ comprises the following structure (IV):

$$-R^3-X \quad (IX)$$

wherein $-R^3$ is selected from an alkylene group, an oxyalkylene group, an alkylene aryl group, an alkenylene group, an oxyalkenylene group, and an alkenylene aryl group; and X represents a group which comprises at least one reactive functional group selected from a hydroxyl group, a carboxyl group, an isocyanate group, a blocked polyisocyanate group, a primary amine group, a secondary amine group, an amide group, a carbamate group, a urea group, a urethane group, a vinyl group, an unsaturated ester group such as an acrylate group and a methacrylate group, a maleimide group, a fumarate group, an onium salt group such as a sulfonium group and an ammonium group, an anhydride group, a hydroxy alkylamide group, and an epoxy group.

Formulae (II) and (III) are diagrammatic, and are not intended to imply that the parenthetical portions are necessarily blocks, although blocks may be used where desired. In some cases the polysiloxane may comprise a variety of siloxane units. This is increasingly true as the number of siloxane units employed increases, and especially true when mixtures of a number of different siloxane units are used. In those instances where a plurality of siloxane units are used and it is desired to form blocks, oligomers can be formed which can be joined to form the block compound. By judicious choice of reactants, compounds having an alternating structure or blocks of alternating structure may be used.

Particularly suitable polysiloxanes include methylphenyl polysiloxane and others sold under the name SILRES, available from Wacker Chemie AG.

The amount of the resinous binder (a) in the first curable film-forming composition can vary depending in part upon the intended application of the composition. In a typical embodiment, the resinous binder (a) is present in an amount ranging from 5 to 85 weight percent based on the total weight of the composition.

Typically, the resinous binder is present as a liquid or dispersion, although combinations of liquid and solid resins can be used as long as the desired viscosity of the curable composition is obtained from the other components of the composition.

If necessary, the first curable composition may further comprise one or more contemporaneous and/or latent curing agents, depending on the nature of the resinous binder (a). Curing agents have functional groups reactive with functional groups in the resinous binder (a). Useful curing agents include: dicyandiamide; polyurea; aliphatic, cycloaliphatic, and aromatic polyfunctional amines such as ethylene diamine, diethylene triamine, triethylene tetraamine, tetraethylene pentamine, 1,4-diaminobutane; 1,3-diaminobutane, hexamethylene diamine, 3-(N-isopropylamino)propylamine, diaminocyclohexane, and polyoxypropylene amines commercially available under the trademark designation JEFFAMINE®; meta-phenylene diamine; p,p'-methylene dianiline, and 1,4-aminonaphthalene; polyamides such as those derived from fatty acids, dimerized fatty acids or polymeric fatty acids and aliphatic polyamines, for example, the materials commercially available from Henckel under the trademark designations VERSAMIDE 220 or 125. Adducts of dicyandiamide and 2-methylimidazole are also suitable. Latent cure systems may also comprise substituted urea accelerators such as phenyl dimethyl urea, toluene dimethyl urea, cycloaliphatic bisurea available as OMICURE from CVC Specialty Chemicals, Polyamine curing agents available under the names EPI-CURE from Hexion Specialty Chemicals are used often in the compositions of the present invention.

Combinations of curing agents may be suitable; in a particular embodiment of the present invention, the resinous binder (a) comprises an aqueous polyepoxide and the curing agent (b) is present and comprises dicyandiamide and a polyurea functional reaction product of diethylene glycol adipate, isophorone diisocyanate, and dimethylamine.

When used, the curing agent (b) is present in the first curable composition in an amount ranging from 0.5 to 50 percent by weight, based on the total weight of the composition.

The first curable film-forming compositions used to prepare the coated articles of the present invention further comprise a metallic reflective pigment. Suitable metallic pigments include aluminum such as aluminum flake, copper or bronze flake and metal oxide coated mica. Silica encapsulated aluminum pigment is particularly suitable in certain embodiments of the present invention. The metallic reflective pigment is used in an amount ranging from 5 to 30 percent, often 12 to 24 percent by weight based on the total weight of the composition.

In certain embodiments of the present invention, the first curable film-forming composition is essentially free of titanium dioxide. By "essentially free" is meant that if the material is present in the composition, it is present incidentally in an amount less than five percent by weight, usually less than trace amounts.

The first curable film-forming compositions may additionally contain adjuvant resins. Acrylic polymers are most often used as adjuvant resins. The acrylic polymers may be prepared from any known ethylenically unsaturated monomers having acrylic or methacrylic functionality, and may be additionally prepared with non-acrylic ethylenically unsaturated monomers using techniques known in the art. Particularly suitable acrylic polymers useful as adjuvant resins in the curable film-forming composition of the present invention contain reactive functional groups such as active hydrogen groups. Examples include Acrylic latex P8182, available from PPG Industries, Inc.

The first curable film-forming compositions can include a variety of optional ingredients and/or additives that are somewhat dependent on the particular application of the curable composition, such as pigments, reinforcements, thixotropes, accelerators, surfactants, plasticizers, extenders, stabilizers, corrosion inhibitors, diluents, and antioxidants. Suitable thixotropes include organic thickeners, bentonite, and fatty acid/oil derivatives. Rheology additives that further aid in pigment orientation, such as DISPARLON, a polyamide wax available from King Industries, are used often in the composition of the present invention. Thixotropes are generally present in an amount of up to about 7 weight percent.

Diluents and plasticizers can be present in an amount of up to about 50 weight percent of the total weight of the curable composition. Examples of suitable diluents include low molecular weight (from about 100 to about 2000) aliphatic or aromatic ester compounds containing one or more ester linkages, and low molecular weight aliphatic or aromatic ethers containing one or more ether linkages and combinations thereof. Reactive diluents are designed to modify strength and/or adhesion of the cured composition, such as aliphatic and/or aromatic mono, di, or tri epoxides having a weight average molecular weight of about 300 to about 1500, can be present in the range of up to about 30 weight percent of the total weight of the curable composition (preferably 5 to 10 percent).

The first curable film-forming compositions are typically liquid and may be solventborne or waterborne. By "liquid" is meant that the compositions have a viscosity that allows them to be at least extrudable. The compositions may have a viscosity that allows them to be at least pumpable, and often the compositions have a viscosity that allows them to be at least sprayable. Often the composition can be continuously agitated before spraying for homogeneous pigment dispersion.

Liquid compositions that are suitable for use in the first curable film-forming composition include liquid resin systems that are 100 percent resin solids, liquid resins that are dissolved or dispersed in a liquid medium, and solid particulate resins that are dispersed in a liquid medium. Liquid media may be aqueous based or organic solvent based.

The first curable film-forming compositions can be prepared in a number of ways, including as a one-package composition with a latent curing agent or as a two-package composition, typically curable at ambient temperature. Two-package curable compositions are typically prepared by combining the ingredients mixing the two parts immediately before use. A one-package composition can be prepared in advance of use and stored. An exemplary one-package composition contains polyurea and dicyandiamide as the curing agent (b). Polyamine and/or epoxy-amine curing agents are typically used in two-package systems.

The preparation of the curable composition can be in a manner similar to that of U.S. Pat. No. 4,739,019, at column 6, lines 2-62, using mixing equipment known to those skilled in the art such as triaxial, Cowel, Nauta and Hockmeyer mixers.

The composition may be applied to the substrate by one or more of a number of methods including spraying, extruding, brushing, or by hand with a blade. The composition has a viscosity that allows it to be at least extrudable. The composition is most often applied by electrostatic spraying.

The compositions can be cured by allowing them to stand at ambient temperature, or a combination of ambient temperature cure and baking, or by baking alone, depending on the cure chemistry. The compositions can be cured at ambient temperature typically in a period ranging from about 24 hour to about 36 hours. If ambient temperature and baking are utilized in combination, the composition is typically allowed to stand for a period up to 24 hours followed by baking at a temperature of from about 75° C. to about 200° C., often from about 150° C. to about 180° C., for a period of time ranging from about 20 minutes to about 1 hour.

In the preparation of the coated articles of the present invention, a second curable film-forming composition is applied to the opposing surface of the substrate. The second curable film-forming compositions comprise one or more epoxy-functional polymers, each polymer typically having at least two epoxide or oxirane groups per molecule. As used herein, "epoxy-functional polymers" means epoxy-functional oligomers, polymers and/or copolymers. These materials often are referred to as di- or polyepoxides. Generally, the epoxide equivalent weight of the epoxy-functional polymer can range from about 70 to about 4,000, and usually about 140 to about 600, as measured by titration with perchloric acid and quaternary ammonium bromide using methyl violet as an indicator.

Suitable epoxy-functional polymers can be saturated or unsaturated, cyclic or acyclic, aliphatic, alicyclic, aromatic or heterocyclic. The epoxy-functional polymers can have pendant or terminal hydroxyl groups, if desired. They can contain substituents such as halogen, hydroxyl, and ether groups. A useful class of these materials includes polyepoxides comprising epoxy polyethers obtained by reacting an epihalohydrin (such as epichlorohydrin or epibromohydrin) with a di- or polyhydric alcohol in the presence of an alkali. Suitable polyhydric alcohols include polyphenols such as resorcinol; catechol; hydroquinone; bis(4-hydroxyphenyl)-2,2-propane, i.e., bisphenol A; bis(4-hydroxyphenyl)-1,1-isobutane; 4,4-dihydroxybenzophenone; bis(4-hydroxyphenol)-1,1-ethane; bis(2-hydroxyphenyl)-methane and 1,5-hydroxynaphthalene.

Frequently used polyepoxides include diglycidyl ethers of Bisphenol A, such as EPON® 828 epoxy resin which is commercially available from Hexion Specialty Chemicals, Inc. EPON® 828 epoxy resin has a number average molecular weight of about 400 and an epoxy equivalent weight of about 185-192. Other useful polyepoxides include polyglycidyl ethers of polyhydric alcohols, polyglycidyl esters of polycarboxylic acids, polyepoxides that are derived from the epoxidation of an olefinically unsaturated alicyclic compound, polyepoxides containing oxyalkylene groups in the epoxy molecule, epoxy novolac resins, and polyepoxides that are partially defunctionalized by carboxylic acids, alcohol, water, phenols, mercaptans or other active hydrogen-containing compounds to give hydroxyl-containing polymers. These polyepoxides are well known to those skilled in the art and are described in U.S. Pat. No. 4,739,019 at column 2, line 6 through column 3, line 12.

The amount of the epoxy-functional polymer in the second curable composition can vary depending in part upon the intended application of the composition. In a typical embodiment, the epoxy-functional polymer is present in an amount ranging from 15 to 85 weight percent of the total weight of the curable composition, usually 25 to 65 weight percent, and often 35 to 55 weight percent.

Typically, the polyepoxides are present as liquids or dispersions, although combinations of liquid and solid epoxy-functional polymers can be used as long as the desired viscosity of the second curable composition is obtained from the other components of the composition.

Polyepoxides can also be present in form of an adduct with functional polybutadiene, dimer acid, etc.

The second curable composition also comprises one or more essentially thermoplastic polyester polymers. As used herein, "essentially thermoplastic" means that the thermoplastic polymer can contain some percentage of unsaturated units so long as the thermoplastic nature of the polymer is maintained, i.e., it does not react with the other components of the curable composition but rather is present as a blended ingredient. The thermoplastic polyester polymer is intended to retard shrinkage of the composition at the time of curing. In certain embodiments the saturated polyester type of thermoplastic polymer contains no more than about 10 percent by weight of unsaturated units, the percentage being based on the total weight of all of the ingredients of the polyester.

The thermoplastic polyester polymer is typically substantially insoluble in the epoxy-functional polymer. As used herein, "substantially insoluble" means that the mixture of epoxy-functional polymer and thermoplastic polyester polymer forms a heterogeneous phase that can be hazy. Such thermoplastic polymers usually have a glass transition temperature of less than about 80° C. Non-limiting examples of suitable thermoplastic polymers include: saturated polyesters including saturated aliphatic polyesters such as polyneopentyl adipate, polypropylene adipate and poly epsilon-caprolactone; saturated polyester urethanes, and the like.

Usually, the thermoplastic polyester polymer is non-reactive with the curable epoxy-functional polymer or other components in the curable composition. It provides an intermingling soft segment in what is otherwise a stiff epoxy matrix. This mechanism is essential in enhancing vibration damping properties. Also, the thermoplastic polymer is substantially free of aromatic units "Substantially free of aromatic units" means that the thermoplastic polymer contains no more than 10 percent by weight of aromatic units, the percentage being based upon the total weight of all of the ingredients of the thermoplastic polymer. As used herein, an aromatic unit is intended to mean a six carbon ring having pendant hydrogen atoms, the ring having pi electron orbitals above and below the plane of the ring structure, as in benzene.

Most frequently used thermoplastic polymers are substantially saturated polyesters that satisfy the aforedescribed requirements and are prepared from polyfunctional acids and polyhydric alcohols by methods such as are disclosed in U.S. Pat. No. 4,739,019 at column 3, line 22 through column 5, line 15. Examples of suitable saturated acids for preparing these saturated polyesters include adipic acid, azelaic acid, sebacic acid and the anhydrides thereof where they exist. When some proportion of unsaturation is present, it is commonly introduced by the use of unsaturated polyfunctional acids such as maleic acid and fumaric acid. Commonly utilized polyhydric alcohols are ethylene glycol, propylene glycol, diethylene glycol, dipropylene glycol, butylene glycol, glycerol, trimethylolpropane, pentaerythritol and sorbitol. Typically the polyester is prepared from a diol and a diacid. These polyesters can be modified with oils or fatty acids, i.e., alkyd resins.

The thermoplastic polyester polymer generally has a weight average molecular weight of up to about 200,000, often less than about 20,000, more often less than about 10,000, and most often from about 1,000 to about 8,000 grams per mole. The thermoplastic polymer can be prepared by condensation polymerization methods well known to those skilled in the art.

Generally, the amount of the thermoplastic polyester polymer is effective to reduce shrinkage and enhance vibration damping of the cured composition. In certain embodiments, the thermoplastic polyester polymer is present in the curable composition in an amount ranging from 1 to 45 percent by weight based on the total weight of the composition, often 3 to 30 percent by weight, and more often 5 to 25 percent by weight.

The second curable composition used to prepare the coated article of the present invention further comprises one or more contemporaneous and/or latent curing agents having functional groups reactive with the epoxide groups in the epoxy-functional polymer(s). Useful curing agents include: aliphatic, cycloaliphatic, and aromatic polyfunctional amines such as ethylene diamine, diethylene triamine, triethylene tetraamine, tetraethylene pentamine, 1,4-diaminobutane; 1,3-diaminobutane, hexamethylene diamine, 3-(N-isopropylamino)propylamine, diaminocyclohexane, and polyoxypropylene amines commercially available under the trademark designation JEFFAMINE®; meta-phenylene diamine; p,p'-methylene dianiline, and 1,4-aminonaphthalene; polyurea; polyamides such as those derived from fatty acids, dimerized fatty acids or polymeric fatty acids and aliphatic polyamines, for example, the materials commercially available from Henckel under the trademark designations VERSAMIDE 220 or 125; imidazoles; dicyandiamide; and boron trifluoride complexes such as boron trifluoride monoethylamine complex, boron trifluoride diethylamine complex; boron trifluoride triethylamine complex; boron trifluoride pyridine complex; boron trifluoride benzyldimethylamine complex; boron trifluoride benzylamine, boron trifluoride etherate and curing agents disclosed in U.S. Pat. No. 4,739,019, at column 5, lines 24-62. Latent cure systems may also comprise substituted urea accelerators such as phenyl dimethyl urea, toluene dimethyl urea, cycloaliphatic bisurea available as OMICURE from CVC Specialty Chemicals.

The curing agent is present in latent curable compositions in an amount ranging from 1.3 to 15 percent by weight, based on the total weight of the composition.

In a two-package composition according to the present invention, the curing agent may be present in an amount of 1 to 50 percent by weight, based on the weight of polyepoxide present in the composition.

The second curable composition of the present invention may further comprise a mineral filler. Examples of fillers that can be present include finely divided minerals such as clays mica, dolomite, talc, zinc borate, magnesium carbonate, calcium oxide, calcium carbonate, precipitated calcium carbonate, calcium silicate, and/or calcium metasilicate. When present, the mineral filler is used in an amount ranging from 5 to 40 percent by weight based on the total weight of the composition.

In certain embodiments of the present invention, the second curable film-forming composition is essentially free of mineral fillers. In particular, the composition may be essentially free of mineral fillers that do not act as thixotropes. For the purposes of this invention, inorganic additive pigments are not considered mineral fillers.

The second curable composition further comprises expandable microspheres and/or hollow microspheres. Chemical blowing agents that produce open cell foam without any shell can be used in limited quantities. Typically the density of the cured composition is less than 1 g/cc due to the presence of these microspheres. Expandable microspheres expand during curing of the composition such that upon curing, the density of the cured composition with expanded microspheres is lower than the density of the composition before curing. Often, the density of the cured composition is less than half of the density of the composition before curing when expandable microspheres are present. The expandable microspheres in the composition of the present invention usually comprise a thermoplastic polymeric shell containing a volatile liquid propellant. Upon heating to a temperature above the softening point of the polymer and the boiling point of the propellant, the spheres expand to as much as five times their original diameter. The expandable microspheres have a particle size prior to incorporation into the composition ranging from 2 to 50 microns. Grades are selected based on application temperature.

The polymeric shell of the expandable microsphere may be a polymer or copolymer of, for example, vinyl chloride, vinylidene chloride, acrylonitrile, methyl methacrylate, styrene, or mixtures thereof. Suitable propellants include freons, such as trichlorofluoromethane, hydrocarbons, such as n-pentane, isopentane, neopentane, butane, isobutane, or other conventional propellants.

In addition to reducing the density of the composition upon curing, the expandable microspheres prevent shrinkage of the composition during cure, allowing a substrate to which the composition is applied to retain its surface shape and appearance when the composition is used as a coating.

Expandable microspheres such as those described in U.S. Pat. Nos. 4,005,033 and 5,155,138 are suitable for use in the second curable film-forming composition. Particularly useful expandable and expanded microspheres are available from Akzo Nobel AB under the name EXPANCEL and from Henkel Corporation under the name Dualite.

When present, the expandable microspheres are used in an amount ranging from 1 to 10 percent by weight, usually 2 to 5 percent by weight, based upon total weight of the second composition.

As noted above, the composition may further comprise hollow microspheres having rigid or flexible shells. Such microspheres are not expandable, and may be used in addition to or instead of the expandable microspheres. Glass, plastic, and/or ceramic microspheres may be used. Often a combination of glass and ceramic microspheres are used. When present, the hollow microspheres are used in amounts of 1 to 25 percent by weight, based on the total weight of the composition.

Low density microspheres such as the expandable and hollow microspheres discussed above tend to separate from rest of the composition in storage. Thixotropes may be used to keep the composition in a homogeneous phase. Examples of thixotropes are Bentone clay (Bentone from Elementis Specialties), Laponite, polyamide powder (Disparlon from King Industries), etc. The formulated product can be heated up to 60° C. for flowability and easy application. High levels of low density microspheres can cause the composition to exhibit high viscosity even at 60° C., so it may be desirable to formulate for low viscosity while maintaining homogeneity by using low amounts of filler and/or microspheres. However, the uniqueness of certain embodiments of the present invention is due in part to the use of both mineral fillers, which impart high density and mass to the composition needed to enhance vibration damping, and microspheres, which lower the density thereof. Using both appears to be counterintuitive, in view of their opposing effects. Conventional compositions typically do not contain both mineral fillers and microspheres.

The second curable compositions can include a variety of optional ingredients and/or additives that are somewhat dependent on the particular application of the curable composition, such as pigments including carbon black or graphite, reinforcements, thixotropes, accelerators, surfactants, plasticizers, extenders, PVC, oligomers such as urethane and acrylates, stabilizers, corrosion inhibitors, diluents, antioxidants, and chemical blowing agents Suitable thixotropes include fumed silica, bentonite, stearic acid-coated calcium carbonate and fatty acid/oil derivatives. Thixotropes are generally present in an amount of up to about 7 weight percent. Generally, the amount of an inorganic extender can be up to about 50 weight percent based upon the total weight of the curable composition. Optional additional ingredients such as carbon black or graphite, surfactants and corrosion inhibitors are present if required in an amount of less than about 5 weight percent of the total weight of the curable composition.

Diluents and plasticizers can be present in an amount of up to about 50 weight percent of the total weight of the curable composition. Examples of suitable diluents include low molecular weight (from about 100 to about 2000) aliphatic or aromatic ester compounds containing one or more ester linkages, and low molecular weight aliphatic or aromatic ethers containing one or more ether linkages and combinations thereof. Reactive diluents are designed to modify strength and/or adhesion of the cured composition, such as aliphatic and/or aromatic mono, di, or tri epoxides having a weight average molecular weight of about 300 to about 1500, can be present in the range of up to about 30 weight percent of the total weight of the curable composition (preferably 5 to 10 percent).

The second compositions of the present invention are typically liquid. The compositions may have a viscosity that allows them to be at least pumpable, and often the compositions have a viscosity that allows them to be at least sprayable. Often the composition can be warm applied, for example, at a temperature of 50° C. to 60° C. to facilitate pumping, spraying, or extruding through a nozzle.

Liquid compositions that are suitable for use include liquid resin systems that are 100 percent solids, liquid resins that are dissolved or dispersed in a liquid medium, and solid particulate resins that are dispersed in a liquid medium. Liquid media may be aqueous based or organic solvent based.

The second curable compositions can be prepared in a number of ways, including as a one-package composition with a latent curing agent or as a two-package composition, typically curable at ambient temperature. Two package curable compositions are typically prepared by mixing the two packages immediately before use. A one-package composition can be prepared in advance of use and stored. Note that expandable microspheres require heat for expansion, and are most effective in compositions that undergo a heated cure.

The preparation of the second curable composition can be in a manner similar to that of U.S. Pat. No. 4,739,019, at column 6, lines 2-62, using mixing equipment known to those skilled in the art such as triaxial, Littleford, Sigma, and Hockmeyer mixers.

The second compositions can be cured by allowing them to stand at ambient temperature, or a combination of ambient temperature cure and baking, or by baking alone. The compositions can be cured at ambient temperature typically in a period ranging from about 24 hour to about 36 hours. If ambient temperature and baking are utilized in combination, the composition is typically allowed to stand for a period up to 24 hours followed by baking at a temperature of from about 75° C. to about 200° C., often from about 150° C. to about 180° C., for a period of time ranging from about 20 minutes to about 1 hour.

After application of the first composition of the present invention to the surface of the substrate and after curing, when the coated surface is exposed to a heat source having a temperature up to 390° C. at a distance of at least ½ inch (1.27 cm), the reverse side of the substrate is at least 20 Celsius degrees lower than the temperature of the reverse side of a similar substrate without the curable film-forming composition (i. e., an uncoated substrate). In particular, after application to a surface of a steel substrate and after curing, when the coated surface is exposed to a heat source having a temperature up to 390° C. at a distance of ½ inch (1.27 cm), the reverse side of the substrate is at least 250 Celsius degrees lower than the temperature of the heat source.

In certain embodiments of the present invention, after application of the first composition to a steel substrate and after curing, when the coated surface is exposed to a heat source having a temperature up to 390° C. at a distance of 1 inch (2.54 cm), the reverse side of the substrate is at least 295 Celsius degrees lower than the temperature of the heat source.

In certain embodiments of the present invention, after application of the second composition of the present invention to the substrate and upon curing, the composition demonstrates a Material Loss Modulus of at least 2000 PSI at at least one point within the temperature range of 32° F. (0° C.) to 225° F. (107.2° C.) and at 1 KHz frequency. Certain compositions may demonstrate a Material Loss Modulus of at least 2000 PSI across at least one entire temperature range, such as, for example, within the temperature range of 75° F. (23.9° C.) to 165° F. (73.9° C.). Compositions may additionally demonstrate a Material Loss Modulus of at least 2000 PSI outside the temperature range of 32° F. (0° C.) to 225° F. (107.2° C.), such as below 32° F. (0° C.) and/or above 225° F. (107.2° C.). Compositions typically demonstrate a peak Material Loss Modulus below 175° F. (79.4° C.) at 1 KHz frequency.

In certain embodiments of the present invention, after application of the second composition to the substrate and upon curing, the composition demonstrates a Material Loss Factor of at least 0.04 at at least one point within the temperature range of 115° F. (46.1° C.) to 225° F. (107.2° C.) and at 1 KHz frequency. Again, certain compositions may demonstrate a Material Loss Factor of at least 0.04 across at least one entire temperature range within the broad range above. Compositions may additionally demonstrate a Material Loss Factor of at least 0.04 outside the temperature range of 115° F. (46.1° C.) to 225° F. (107.2° C.).

In certain embodiments of the present invention, after application of the second composition to the substrate and upon curing, the composition demonstrates Thermal Conductivity of <0.1 W/mK and Thermal Resistivity of >10 mK/W (Add a claim).

After application of the first and the second compositions to a surface of a steel substrate and after curing, when the reflective coating surface is exposed to a heat source having a temperature up to 390° C. at a distance of at least 1 inch (1.27 cm), the reverse side of the composite is at least 45 Celsius degrees lower than the temperature of the reverse side of a similar substrate without the curable film-forming compositions. In certain embodiments, when the reflective coating surface is exposed to a heat source having a temperature up to 390° C. at a distance of ½ inch (1.27 cm), the reverse side of the composite is at least 300 Celsius degrees lower than the temperature of the heat source. In addition, when the reflective coating surface is exposed to a heat source having a temperature up to 390° C. at a distance of 1 inch (2.54 cm), the reverse side of the composite is at least 325 Celsius degrees lower than the temperature of the heat source.

Figure 2:
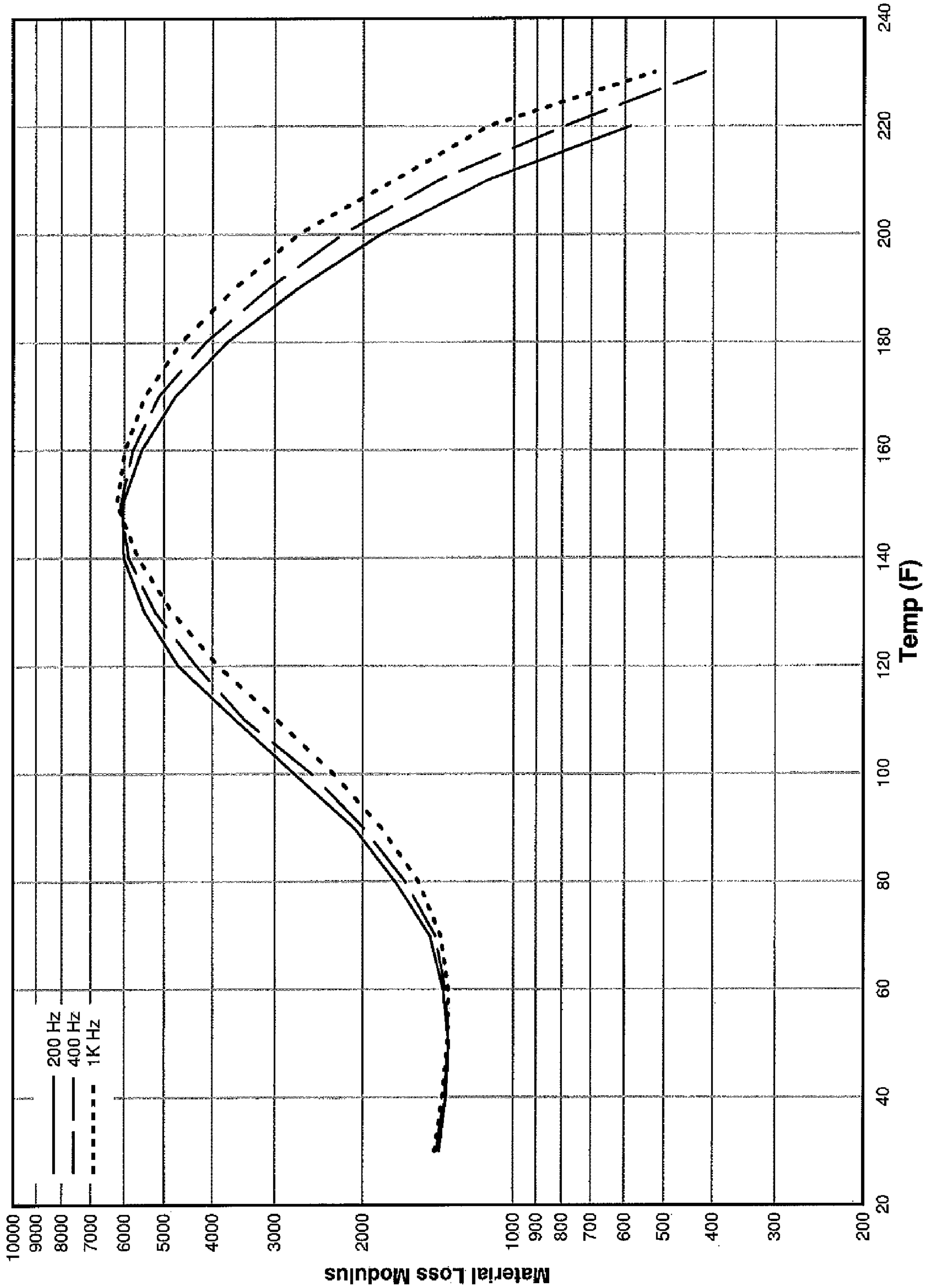
FIG. 2 illustrates a graph of Material Loss Modulus at frequencies of 200 Hz, 400 Hz, and 1 KHz for the composition of Example B.

In certain embodiments of the present invention, the material Damping Loss Factor of the second composition is >0.1 at or above 120° F. and the material Loss Modulus is >2000 PSI between 100° F. and 190° F. at at least 200, 400, and 1000 Hz frequencies bands. See FIGS. 1 and 2.

In certain embodiments (such as example C) of the present invention, after application of the second composition to the substrate and upon curing, the composition demonstrates a sound absorption coefficient of 0.3 or greater at at least one frequency within the range of 100 to 6300 Hz.

The present invention further provides a coated article comprising.

a) a substrate having two opposing surfaces, b) a first reflective coating composition applied on one surface having at least 1 mil dry thickness, and c) a second insulative coating applied on the opposing surface having at least 80 mils wet thickness. In this embodiment of the present invention, the coated article upon curing exhibits a Thermal resistivity of at least 10 mK/W, Material Damping Loss Factor of at least 0.1 at or above 120° F. between 200 and 1000 HZ, Material Loss Modulus of at least 2000 PSI between 32° F. and 225° F. in at least one frequency band between 50 and 10,000 Hz. and sound absorption coefficient of 0.3 or greater at at least one frequency within the range of 100 to 6300 Hz.

The substrates used in this embodiment of the present invention may be any of those disclosed above. The first reflective coating may be any of the first curable film-forming compositions disclosed above. Alternatively, the reflective coating may comprise a polymethylsilsesquioxane polymer. The second insulative coating may be any of the second curable film-forming compositions disclosed above.

The following examples are intended to illustrate various embodiments of the invention, and should not be construed as limiting the invention in any way.

Examples 1 to 4 demonstrate heat reflective coating compositions prepared in accordance with the present invention.

| RAW MATERIAL | 1 | 2 | 3 | 4 |
|---|---|---|---|---|
| | Part A | | | |
| EPI-REZ 6520[1] | 50.0 | 50.0 | 15.0 | |
| Acrylic latex P8182[2] | 12.5 | | | |
| Silkopone EW[3] | | | | |
| Silkopone EF[4] | | | | |
| Silres MP42E[5] | | | | 50.0 |
| Vylomax HR-11NN[6] | | | | |
| U-varnish A[7] | | | | |
| Polyurea P8183[8] | 0.90 | 0.90 | | |
| Dicy[9] | 1.3 | 1.3 | | |
| STAP IL HYDROLAN 2153[10] | 25.0 | 21.0 | 9.7 | 21.0 |
| Toyo ALPASTE TCR 6130[11] | | | | |
| Downol PM[12] | 6.25 | 6.25 | 3.00 | 6.25 |
| M-Pyrol[13] | | | | |
| Downol DPnB[14] | 6.25 | 6.25 | 2 | 6.25 |
| | Part B | | | |
| EPI-KURE 6870-W-53[15] | | | 9.0 | |
| TOTAL WEIGHT | 102.200 | 85.700 | 38.700 | 83.500 |

[1]Waterborne dispersion of solid Bisphenol A epoxy resin from Hexion Specialty Chemicals
[2]Acrylic Latex available from PPG Industries, Adrian, Michigan
[3]Solvent borne silicone epoxide from Evonik Industries
[4]Solvent-free silicone epoxy from Evonik Industries
[5]Aqueous methylphenyl silicone resin emulsion from Wacker Chemical Corporation
[6]Polyamideimide from Toyobo Company
[7]Polyimide Varnish from UBE Industries, Ltd.
[8]Polyurea available from PPG Industries, Adrian, Michigan
[9]Dicyandiamide available from ALZ CHEM
[10]Silica encapsulated Aluminum flakes from Eckart America Corporation
[11]Aluminum pigment paste from TOYO ALUMINUM K.K.
[12]PROPYLENE GLYCOL MONOMETHYL ETHER from Dow Chemical Co.
[13]N-METHYL-2-PYRROLIDONE from INTERNATIONAL SPECIALTY PRODUCTS
[14]DIPROPYLENE GLYGOL N-BUTYL ETHER from Dow Chemical Co.
[15]Modified epoxyamine adduct from Hexion Specialty Chemicals Mixing for Part A and first component was done in Speedmixer DC 600FVZ. Mix ingredients 1 to 8 at 2350 RPM for 60 seconds. Add 9 and mix seconds. Then add 10 to 14 followed by 60 second mix at 2350 RPM. Freshly agitated mix was used to make a draw down on 4"×12" panels. Part B or second component for 2K system was mixed with Part A for 60 seconds in at 2350 RPM prior to draw down. 5 to 7 mils wet thickness was applied on the panel.

EXAMPLES A AND B

Sound Damping Compositions

| RAW MATERIAL | Example A |
|---|---|
| EPON 828[1] | 77.34 |
| Epon 154[2] | |
| MICA C-3000[3] | 30.00 |
| Vansil W-10[4] | 10.00 |
| Borogard ZB[5] | |
| CaO[6] | 2.55 |
| Bentone 27[7] | 2.00 |
| Bentone 38[8] | 3.00 |
| Epoxidized dimer acid[9] | |
| Polyurea P8091[10] | 6.68 |
| DICY[11] | 8.00 |
| EPON 828/CTBN adduct[12] | |
| Extendosphere TG[13] | 15.00 |
| Erysis GE-35[14] | 10.00 |
| Dualite U024-145D01[15] | 3.80 |
| Cabosil M5[16] | 1.70 |
| VS5500 Scotchlite Glass Bubbles[17] | 15.00 |
| Expancel 551DE[18] | |
| Diethylene glycol adipate polyester[19] | 14.00 |
| CARDOLITE NC-513[20] | 14.00 |
| TOTAL WEIGHT | 213.070 |

| | |
|---|---|
| SOLIDS | 100% |
| WPG (WET) | 9.085 |
| Density, g/cc(wet) | 1.09 |
| Brookfield #7 spindle @ 20 RPM, cps @60 C. | 20M |

| RAW MATERIAL | Example B |
|---|---|
| EPON 828[1] | 56.14 |
| Epon 154[2] | 10.00 |
| MICA C-3000[3] | 30.00 |
| Vansil W-10[4] | 10.00 |
| Borogard ZB[5] | 20.00 |
| CaO[6] | 2.55 |
| Bentone 27[7] | 2.00 |
| Bentone 38[8] | 3.00 |
| Epoxidized dimer acid[9] | |
| Polyurea P8091[10] | 6.68 |
| DICY[11] | 6.68 |
| EPON 828/CTBN adduct[12] | |
| Extendosphere TG[13] | 15.00 |
| Erysis GE-35[14] | 10.00 |
| Dualite U024-145D01[15] | 7.60 |
| Cabosil M5[16] | 1.70 |
| VS5500 Scothlite Glass Bubbles[17] | 15.00 |
| Expancel 551DE[18] | |
| Diethylene glycol adipate polyester[19] | 14.00 |
| CARDOLITE NC-513[20] | 14.00 |
| TOTAL WEIGHT | 224.350 |

EXAMPLE C

Example C demonstrates the preparation of a composition according to the invention with an absorption coefficient of at least 0.3 at at least one frequency within the range of 100 to 6300 Hz. The test method is described in ISO 10534.

| RAW MATERIAL | Parts by Weight |
|---|---|
| EPON 828[1] | 71.44 |
| MICA C-3000[3] | 30.00 |
| Extendosphere TG[13] | 15.00 |
| Vansil W-10[4] | 10.00 |
| Winnofil SPT[21] | 16.00 |
| CaO[6] | 2.55 |
| DICY[11] | 3.80 |
| Polyurea P8091[10] | 5.60 |
| Epoxidized dimmer acid[9] | 5.60 |
| Bentone 27[7] | 3.00 |
| Bentone 38[8] | 3.00 |
| Erysis GE-35[14] | 10.00 |
| Cabosil M5[16] | 1.70 |
| Dualite U024-145D01[15] | 7.60 |
| VS5500 Scothlite Glass Bubbles[17] | 15.00 |

-continued

| RAW MATERIAL | Parts by Weight |
|---|---|
| Diethylene glycol adipate polyester[19] | 35.00 |
| CARDOLITE NC-513[20] | 8.00 |

Figure 4:
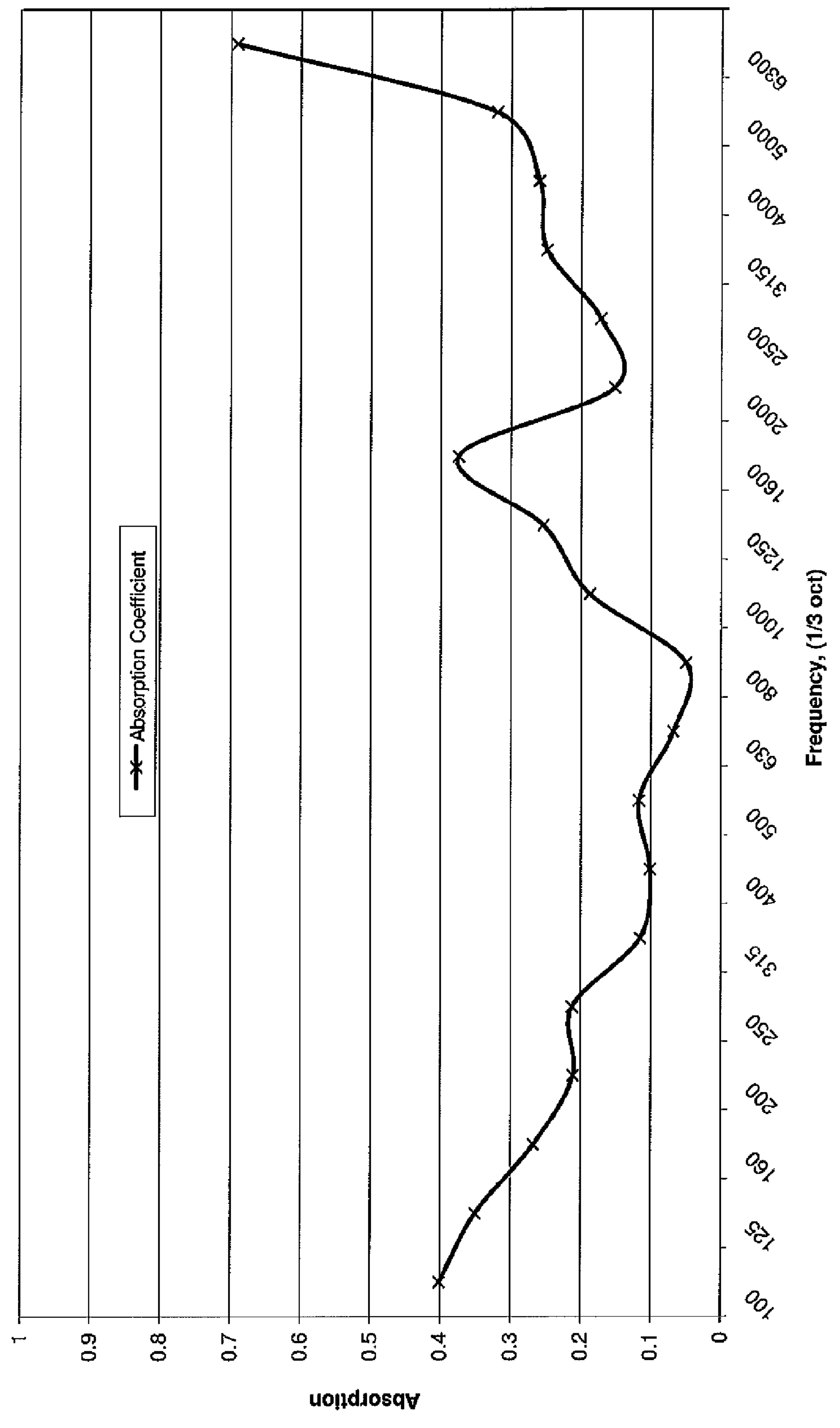
FIG. 4 illustrates Sound Absorption Coefficient properties of Example C

[1]Diglycidyl either of Bisphenol A available from Hexion Specialty Chemicals
[2]Epoxy phenolic novolac resin from Hexion Specialty Chemical;s
[3]Commercially available from KINGS MOUNTAIN MINING LLC
[4]Calcium metasilicate from R T Vanderbilt
[5]Zn Borate from U.S. Borax
[6]commercially available from MISSISSIPPI LIME CO
[7]Rheological additive from ELEMENTIS SPECIALTIES
[8]Rheological additive from ELEMENTIS SPECIALTIES
[9]A material comprising 26.95 weight percent EMPOL 1022 which is a dimer acid sold by Cognis Emery Grp., .06 weight percent triphenyl phosphene, and 72.99 weight percent Epnon 828 - It has an acid nimber below 0.2 and an epoxy equivalent between 330 and 370
[10]Polyurea P8091 commercially available from PPG Industries, EMS
[11]Dicyandiamide available from ALZ CHEM
[12]A material comprising 60 weight % Epon 828 (Hexion) and 40 weight % Hycar CTBN 1300X8 (LUBRIZOL ADVANCED MATERIALS)
[13]GLASS OXIDE, MULLITE BEADS from SPHERE ONE INC
[14]Castor oil glycidyl ether available from CVC Specialties.
[15]Isobutane encapsulated in methyl methacrylate copolymer available from Henkel
[16]Fumed silica available from Cabot corporation
[17]Hollow SODA LIME BOROSILICATE GLASS Bubbles from 3M
[18]Dry Expanded polymeric microspheres from Expancel
[19]This polyester comprise 45.4 weight percent adipic acid and 54.6 weight percent of diethylene glycol. It has a number average molecular weight ranging from 1000 to 5000, an acid value less than 10, and a hydroxy value of approximately 110.
[20]Monofunctional epoxy flexibilizer and diluent from CARDOLITE
[21]Stearate coated precipitated calcium carbonate from SOLVAY & CIE The composition was applied to a MYLAR film at a wet thickness of 2 mm and cured at 350° F. (176.7° C.) for 30 minutes. FIG. 4 illustrates a graph of the absorption coefficient for the composition of Example C.

Mixing Procedure:

Mixing was done in Speedmixer DC 600FVZ. Mix ingredients 1 to 8 at 2350 RPM for 60 seconds. Add 9 to 13 followed by 60 second mix at 2350 RPM. Add 14 to 18 followed by 60 seconds mix at 2350 RPM. Add 19 and mix 30 second at 2350 RPM. Stir in by spatula and place the container in mix and vacuum apparatus until 28-30 in Hg vacuum is achieved.

2½"×4¾"×2" size foam piece was prepared by baking Example B in a metal trough at 350° F. for 40 minutes. Thermal properties Analyzer KD2 Pro from Decagon Devices was used on the foam piece using Dual Needle Probe 30 mm (SH-1) to measure the following properties at 24.3° C.:

| | | |
|---|---|---|
| Conductivity, K | 0.0665 | W/mK |
| Specific Heat, C. | 0.603 | mJ/m3K |
| Diffusivity, D | 0.1105 | mm2/s |
| Resistivity, R | 15.03 | mK/W |

The first (heat reflective) coating compositions of examples 1 to 4 were applied to ACT 40237 CRS,B952 P60DIW, ED6060, 0.032 mil substrate and flashed for 30 minutes at room temperature, followed by two 30 minute at 200° F.+30 minutes at 350° F. Subsequently about 30 mils wet thickness of the second insulative composition was applied on the other side of the substrate, followed by 40 minute cure at 350° F. 30 mil wet coating expands to about 125 to 135 mils after cure. This method was used for convenience in lab testing. However, in plant application it may be feasible to apply both coating before a given paint shop bake condition.

Coated side of the panel was placed ½ inch and 1 inch above a VWR Hot plate VHP-C4 surface. Hot plate was set at 390° C.; however, effective temperature on the hot plate surface was between 390° C. and 450° C. depending on the distance or type of reflective coating on the panel being tested. Thermocouple was not placed on the hot plate surface during testing to avoid interference in radiated heat. A TC405-6 SURFACE PROBE from Fisher Scientific was placed on the backside (uncoated) of the panel and was connected to Omega DP470 Digital Indicator, Scanner and Datalogger as well as a computer to store 30 minutes of continuous readings. Average of 30 minutes of data are reported in the Table:

| Sample | Coating mils (cured) | Hot Plate set @ ° C. | Panel back temp. ° C. 0.5" away | Panel back temp. ° C. 1" away | Reduced from Bare ° C. 0.5" away | Reduced from Bare ° C. 1" away | Reduced from source ° C. 0.5" away | Reduced from source ° C. 1" away |
|---|---|---|---|---|---|---|---|---|
| Bare ED | — | 390 | 156.2 | 111.1 | — | — | 233.8 | 278.9 |
| Insulative Vibration Dampener EX B | 110 | 390 | 116.4 | 85.6 | 39.8 | 25.5 | 273.6 | 304.4 |
| Reflective EX. 1 | 2.5 | 390 | 104.6 | 76.3 | 51.6 | 34.8 | 285.4 | 313.7 |
| Reflective EX. 2 | 1-2 | 390 | 103.8 | 75.8 | 52.4 | 35.3 | 286.2 | 314.2 |
| Reflective EX. 3 air dry | 2 | 390 | 115.3 | 85.1 | 40.9 | 26 | 274.7 | 304.9 |
| Reflective EX. 4 air dry + EX B | 1 | 390 | 94 | 65.9 | 62.2 | 45.2 | 296 | 324.1 |
| Reflective EX. 1 + EX B | 2.5 + 130 | 390 | 76 | 51.9 | 80.2 | 59.2 | 314 | 338.1 |
| Reflective EX. 2 + EX B | 2 + 131 | 390 | 66.1 | 54.8 | 90.1 | 56.3 | 323.9 | 335.2 |
| Reflective EX. 3 air dry + EX B | 2 + 132 | 390 | 90 | 62.7 | 66.2 | 48.4 | 300 | 327.3 |
| Reflective EX. 4 + EX B | 1 + 127 | 390 | 64.5 | 48.7 | 91.7 | 62.4 | 325.5 | 341.3 |

The coating compositions of examples A and B were separately applied to an Oberst Bar measuring 9 inches (L)×0.5 inch (W)×0.032 inch (T) (22.86×1.27×0.081 cm). The test material was applied to an Oberst bar with a template, such that one inch (2.54 cm) of the bar on one end was left uncovered. Bars were conditioned at least 24 hours at room temperature after a 40-minute, 350° F. (177° C.) cure before grinding the excess on edges to match bar's dimensions. Composite Loss Factor (CLF) measurements were done according to ASTM E-756 using a Data Physics SignalCalc analyzer. CLF Measurements were taken for 2 to 7 modes with corresponding resonance frequencies at 0° C., 25° C., 38° C., 66° C., 93° C., and 107° C. Some automotive companies also look at interpolated CLF values at 200 Hz, 400 Hz, 800 Hz, and 1000 Hz. CLF data are for reference only since the coating thickness and weight varies somewhat between the samples due to the purpose of varying density. Density is calculated from net weight of material on the bar and net baked thickness on bar dimension. Average thickness of 20 points on the bar is taken using PosiTector 6000 thickness gage from DeFelsko Corporation. However, it is appropriate to compare the damping performance by calculating the damping loss factor and elasticity (Young's) modulus of the material alone from measurements of the composite loss factor and resonance frequencies of a composite vibrating beam (Oberst bar test) as described in ASTM E-756. The material-only properties can be reported by plotting two or three master curves corresponding to the damping loss factor and storage/loss modulus values. This method is also known as the Reduced-Frequency Nomogram (RFN) (see FIG. 3).

The reduced frequency nomogram (RFN) is a very compact, accurate and convenient vehicle for representing viscoelastic materials properties. Applications engineers very often use the RFN as a guide for selecting materials for designing vibration damping systems. The main advantage of using the RFN is that it permits the extrapolation of material properties data to frequency or temperature ranges where tests were not performed. Extrapolations within the frequency-temperature ranges where the vibrating beam test measurements were performed are always valid and accurate. However, extrapolations made too far outside these test ranges may be less reliable.

Reading from the reduced temperature-frequency nomogram the damping loss factor and storage/loss modulus data (FIG. 3) @1 kHz frequency and a certain temperature of interest involves the following steps:

1. Locate the 1 kHz frequency point on the frequency axis (most right hand side vertical axis).
2. Draw a horizontal frequency line across the nomogram plot, through the 1 kHz frequency point, and extend it as far to the left as to intersect all the oblique temperature lines.
3. Locate the oblique temperature line of interest (e.g. 160° F.).
4. Through the intersection point between the horizontal 1 kHz frequency line and the oblique temperature line a vertical DATA reading line is drawn and extended upwards and downwards as far as to intersect the damping loss factor or the storage/loss modulus curves, respectively.
5. At the point of intersection between the vertical line and the respective curve of interest (e.g. damping loss factor or storage/loss modulus curves) the Y-cursor readings will provide the corresponding damping loss factor or modulus values. The scaling of the Y-cursor values corresponds to the units represented on the damping loss factor or storage/loss modulus axes respectively.
6. Material properties readings can be made at any other temperature of interest (e.g. @30° F., 40° F., 50° F., . . . etc.), by selecting the respective temperature in step three and following steps 4 through 5 accordingly.
7. After all readings of interest have been performed, corresponding data values can be tabulated (e.g. Table 1) for subsequent graphic representation and reporting.

TABLE 1

Figure 3:
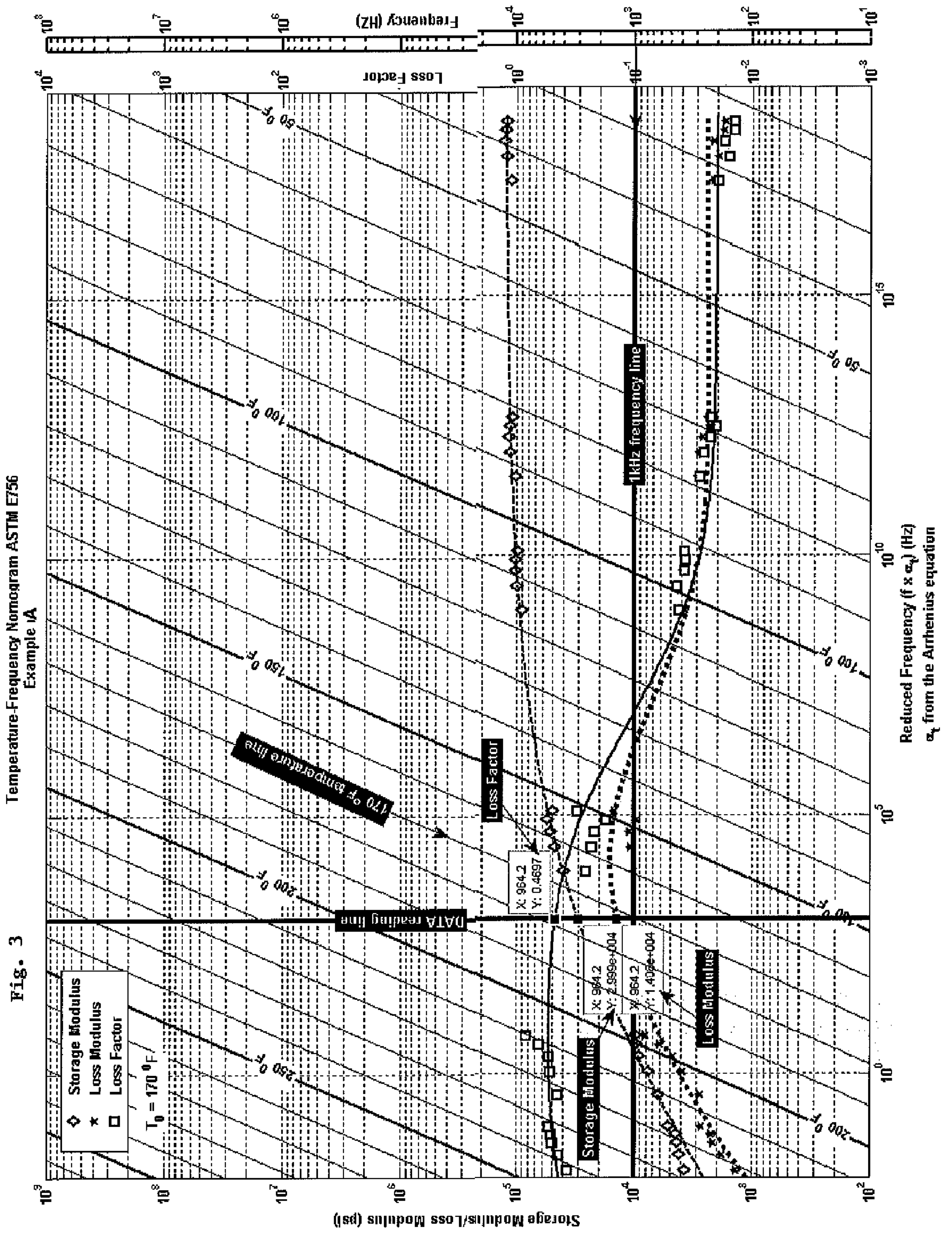
FIG. 3 illustrates a Reduced Temperature-Frequency Nomogram (RFN) according to ASTM E756 for the composition of Example A.

Example of tabulated data based on the nomogram readings shown in FIG. 3.
Table 1: Example A - material data @1 kHz

| Temp (° F.) | Damping Loss Factor | Storage Modulus (psi) | Loss Modulus (psi) |
|---|---|---|---|
| 30 | 0.0200 | 121576.10 | 2432.96 |
| 40 | 0.0200 | 120496.85 | 2414.46 |
| 50 | 0.0201 | 118902.11 | 2391.08 |
| 60 | 0.0203 | 116774.98 | 2369.94 |
| 70 | 0.0208 | 113769.94 | 2365.59 |
| 80 | 0.0220 | 109980.21 | 2415.19 |
| 90 | 0.0248 | 104910.37 | 2605.27 |
| 100 | 0.0318 | 98262.59 | 3128.22 |
| 110 | 0.0443 | 91467.77 | 4055.66 |
| 120 | 0.0728 | 82388.37 | 5997.07 |
| 130 | 0.1281 | 71769.13 | 9193.03 |
| 140 | 0.2084 | 61163.19 | 12745.94 |
| 150 | 0.3096 | 50035.24 | 15489.57 |
| 160 | 0.3965 | 40222.42 | 15948.25 |
| 170 | 0.4634 | 31013.05 | 14371.50 |
| 180 | 0.5096 | 21950.33 | 11186.36 |
| 190 | 0.5291 | 15395.47 | 8146.05 |
| 200 | 0.5330 | 10906.64 | 5813.75 |
| 210 | 0.5256 | 7516.42 | 3950.87 |
| 220 | 0.5013 | 4788.74 | 2400.60 |
| 230 | 0.4692 | 3379.00 | 1585.58 |

Whereas particular embodiments of this invention have been described above for purposes of illustration, it will be evident to those skilled in the art that numerous variations of the details of the present invention may be made without departing from the scope of the invention as defined in the appended claims.

What is claimed is:

1. A coated article comprising:

(a) a substrate having two opposing surfaces;

(b) a first curable film-forming composition applied to one surface of the substrate, the first curable film-forming composition comprising:

(i) a resinous binder comprising a polyepoxide, a polyamideimide, a polyimide, a polysiloxane or combinations thereof;

(ii) optionally, a curing agent having functional groups reactive with functional groups on the resinous binder in (a); and (iii) a metallic reflective pigment; and (c) a second curable film-forming composition applied to the opposing surface of the substrate, wherein said opposing surface is not coated with said first curable film-forming composition, the second curable film-forming composition comprising:

(i) a polyepoxide containing at least two epoxide groups per molecule;

(ii) a thermoplastic polyester polymer;

(iii) a curing agent having functional groups reactive with the epoxide groups in (c)(i);

(iv) a mineral filler; and (v) microspheres comprising expandable microspheres which expand during curing of the composition, hollow microspheres, or combinations thereof.

2. The coated article of claim 1, wherein the resinous binder (b)(i) comprises methylphenyl polysiloxane.

3. The coated article of claim 1, wherein the curing agent (b)(ii) is present and comprises dicyandiamide, a polyurea, an aliphatic polyfunctional amine, a cycloaliphatic polyfunctional amine, an aromatic polyfunctional amine, a polyamide, an adduct of dicyandiamide and 2-methylimidazole, or combinations thereof.

4. The coated article of claim 3, wherein the first curable film-forming composition is a two-package composition.

5. The coated article of claim 3, wherein the first curable film-forming composition is a one-package composition.

6. The coated article of claim 5, wherein the resinous binder (b)(i) comprises an aqueous polyepoxide and the curing agent (b)(ii) is present and comprises dicyandiamide and a polyurea functional reaction product of diethylene glycol adipate, isophorone diisocyanate, and dimethylamine.

7. The coated article of claim 1, wherein the substrate is a steel substrate.

8. The coated article of claim 1, wherein the metallic reflective pigment (b)(iii) comprises silica encapsulated aluminum pigment.

9. The coated article of claim 1, wherein the first curable film-forming composition further comprises an adjuvant resin.

10. The coated article of claim 9, wherein the adjuvant resin comprises an acrylic polymer.

11. The coated article of claim 1, wherein the metallic reflective pigment (b)(iii) comprises an aluminum flake pigment.

12. The coated article of claim 1, wherein the second curable film-forming composition contains expandable microspheres and wherein upon curing, the density of the second curable film-forming composition is less than half of the density of the second curable film-forming composition before curing.

13. The coated article of claim 1, wherein the polyepoxide (c)(i) comprises an epoxy polyether, a polyglycidyl ether of one or more polyhydric alcohols, a polyglycidyl ester of one or more polycarboxylic acids, epoxidated olefinically unsaturated alicyclic compounds, a polyepoxide containing oxyalkylene groups, an epoxy novolac resin, or combinations thereof.

14. The coated article of claim 13, wherein the polyepoxide (c)(i) comprises a polyglycidyl ether of Bisphenol A.

15. The coated article of claim 1, wherein the thermoplastic polyester polymer (c)(ii) is substantially free of aromatic units.

16. The coated article of claim 1, wherein the thermoplastic polyester polymer (c)(ii) does not react chemically with other components of the second curable film-forming composition.

17. The coated article of claim 1, wherein the curing agent (c)(iii) comprises dicyandiamide, polyurea, an aliphatic polyfunctional amine, a cycloaliphatic polyfunctional amine, an aromatic polyfunctional amine, a polyamide, or combinations thereof.

18. The coated article of claim 1, wherein the mineral filler (c)(iv) comprises clay, mica, dolomite, talc, magnesium carbonate, calcium carbonate, precipitated calcium carbonate, zinc borate, calcium silicate, calcium metasilicate, or combinations thereof.

19. The coated article of claim 1, wherein the second curable film-forming composition contains expandable microspheres that have a particle size ranging from 2 to 50 microns prior to incorporation into the second curable film-forming composition.

20. The coated article of claim 1, wherein the second curable film-forming composition contains hollow microspheres comprising hollow glass ceramic microspheres having rigid shells, or combinations thereof.

21. A coated article comprising:

a) a substrate having two opposing surfaces, b) a first reflective coating composition applied on one surface having at least 1 mil dry thickness, and c) a second insulative coating composition applied on the opposing surface having at least 80 mils wet thickness, wherein said opposing surface is not coated with said first reflective coating composition; and wherein, upon curing the coated article exhibits a Thermal Resistivity of at least 10 mK/W, Material Damping Loss Factor of at least 0.1 at or above 120° F. between 200 and 1000 HZ, Material Loss Modulus of at least 2000 PSI between 32° F. and 225° F. in at least one frequency band between 50 and 10,000 Hz., and sound absorption coefficient of 0.3 or greater at least one frequency within the range of 100 to 6300 Hz.

22. The coated article of claim 21, wherein the reflective coating composition comprises polymethylsilsesquioxane polymer.

* * * * *